United States Patent [19]

Benedict

[11] 4,050,296

[45] Sept. 27, 1977

[54] RELATIVE COMPRESSION OF AN INTERNAL COMBUSTION ENGINE

[75] Inventor: Richard S. Benedict, Manchester, Conn.

[73] Assignee: United Technologies Corporation, Hartford, Conn.

[21] Appl. No.: 684,038

[22] Filed: May 7, 1976

[51] Int. Cl.² .......................................... G01M 15/00
[52] U.S. Cl. ..................................................... 73/116
[58] Field of Search ...................... 73/116, 117.2, 115, 73/117.3

[56] References Cited

U.S. PATENT DOCUMENTS

| | | | |
|---|---|---|---|
| 3,765,233 | 10/1973 | Germann | 73/117.2 |
| 3,823,606 | 7/1974 | Maringer | 73/115 |
| 3,839,906 | 10/1974 | Hanson | 73/115 |

*Primary Examiner*—Jerry W. Myracle
*Attorney, Agent, or Firm*—M. P. Williams

[57] ABSTRACT

The compression of each cylinder of a reciprocating, internal combustion engine, expressed in a relative fashion as compared with the compression of another of the cylinders of the engine, is determined by sensing the peaks and valleys in an engine parameter which fluctuates commensurately with fluctuations in engine operating condition while cranking, such as starter current or voltage or instantaneous, subcyclic speed. The difference (D) between each peak and the preceding valley is measured, and these are filtered by averaging them with eight-tenths of the maximum difference, and each is expressed as a percentage of the maximum filtered difference. The time from one peak to the next is compared against some percentage of the average or expected peak to peak time (such as 130%), and if a peak is detected after the maximum allowed time, it is taken as being indicative of one peak being totally missing due to a very weak cylinder, so the difference value for the cylinder which was being looked for is taken to be zero, and the difference value for the cylinder whose peak actually was found is taken to be some fraction (such as 0.7) of the valley to peak difference actually calculated. Whenever the time out test does not indicate a failure, every difference measured is compared against three-tenths of the maximum difference which is expected, and if the difference is below that, the peak measured is used for the following valley, and the processing switches to look for a peak of the following cylinder.

10 Claims, 7 Drawing Figures

RELATIVE COMPRESSION OF AN INTERNAL COMBUSTION ENGINE

CROSS REFERENCE TO RELATED APPLICATIONS

The invention described herein may employ some of the teachings disclosed and claimed in commonly owned copending applications filed on even date herewith by Pettingell et al., Ser. No 684,032, entitled MEASURING ELECTRICAL PARAMETERS OF AN INTERNAL COMBUSTION ENGINE DURING CRANKING; by Rackliffe et al., Ser. No. 684,226, entitled SUB-CYCLIC MEASUREMENT OF SPEED OF AN INTERNAL COMBUSTION ENGINE; and by Tedeschi, Ser. No. 684,221, entitled ENGINE, CYLINDER IDENTIFICATION (CLD) TRANSDUCER.

BACKGROUND OF THE INVENTION

1. Field of the Invention

This invention relates to diagnosing reciprocating internal combustion engines electronically.

2. Description of the Prior Art

It is known in the prior art to analyze the starter current magnitude of an engine while being cranked by an electrical starter motor in order to determine the relative compression of the various cylinders. In one such apparatus known to the art, the starter current waveform is simply plotted as a function of time on a well known chart recorder, and the magnitudes plotted thereon are compared to provide a relative indication of individual cylinder compressions. In a more sophisticated apparatus known to the art, magnitude of starter current is sampled frequently, and the sampled data is analyzed electronically to determine the swings in starter current which relate in some fashion to the individual cylinders. In spark ignition engines, the analysis can be performed by synchronization with the electrical spark control system (the distributor and so forth) on a cylinder by cyclinder basis. However, this system has been found to have shortcomings, particularly in analyzing engines which have gross problems, in which the electrical timing may in fact be significantly displaced from its desired relationship to the crankshaft, which fact is not apparent until diagnosis is complete; obviously, diagnosis which assumes a certain degree of health is less useful than that which does not. Further, such systems are totally useless in engines which do not utilize spark ignition.

SUMMARY OF THE INVENTION

The object of the present invention is improved determination of relative compression from analysis of excursions in engine operating conditions.

According to the present invention, the variations in excursions of an engine parameter, which varies as a consequence of differences in individual cylinder compression, from minima to maxima, which coincide with the compression stroke of each cylinder, is analyzed to provide an indication of relative compression of the cylinders of the engine. In further accord with the present invention, the time interval between a particular point in the parameter excursion wavefrom and the next succeeding like point is compared against a predetermined interval to determine if the adjacent, like points relate to adjacent cylinders; and further, if the interval is actually exceeded, the magnitude for a given cylinder is taken to be minimal, and the magnitude for a succeeding cylinder is derived from the actual measured magnitude. And, each difference between maxima and a minima related to a given cylinder is compared against a predetermined difference, to indicate a case where the excursion is so small that the following point of interest is likely to be undetectable; and further, a point in the excursion for the current cylinder is used as a point in the excursion for the next cylinder.

According further to the invention, the waveform of the parameter magnitude is analyzed during a cycle of the engine to determine the average time per cylinder at the current cranking speed of the engine, some percentage of it being used as said predetermined interval, and to determine the maximum difference, for all of the cylinders, between the maximum and minimum parameter magnitude sensed at the end and the beginning, respectively, of the compression stroke for each cylinder, some fraction thereof being used as said predetermined difference.

According to the invention, the parameter analyzed may be starter current, starter voltage, or instantaneous subcyclic speed.

The present invention, by analyzing the actual parameter waveform, rather than simply sampling it at times otherwise related to the crankshaft angle, provides a firm indication of the instantaneous compression load and therefore work to be performed by the starter or speed, and therefore provides a more accurate interpretation of relative compression of the cylinders. Analysis of the current waveform in terms of the time required to sense peaks and the magnitude of the difference between the valley and the peak related to each given cylinder accommodate cylinders having extremely low or no compression, and avoid ascribing conditions relating to one cylinder to that of an adjacent cylinder.

In accordance still further with the present invention, the magnitudes of parameter differentials for each of the cylinders are normalized about a fraction of the maximum differential taken for any of the cylinders; this form of filtering is provided prior to ratioing the magnitude for each cylinder against the maximum magnitude to provide relative percents against the magnitude, which is the output indication of relative compression.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
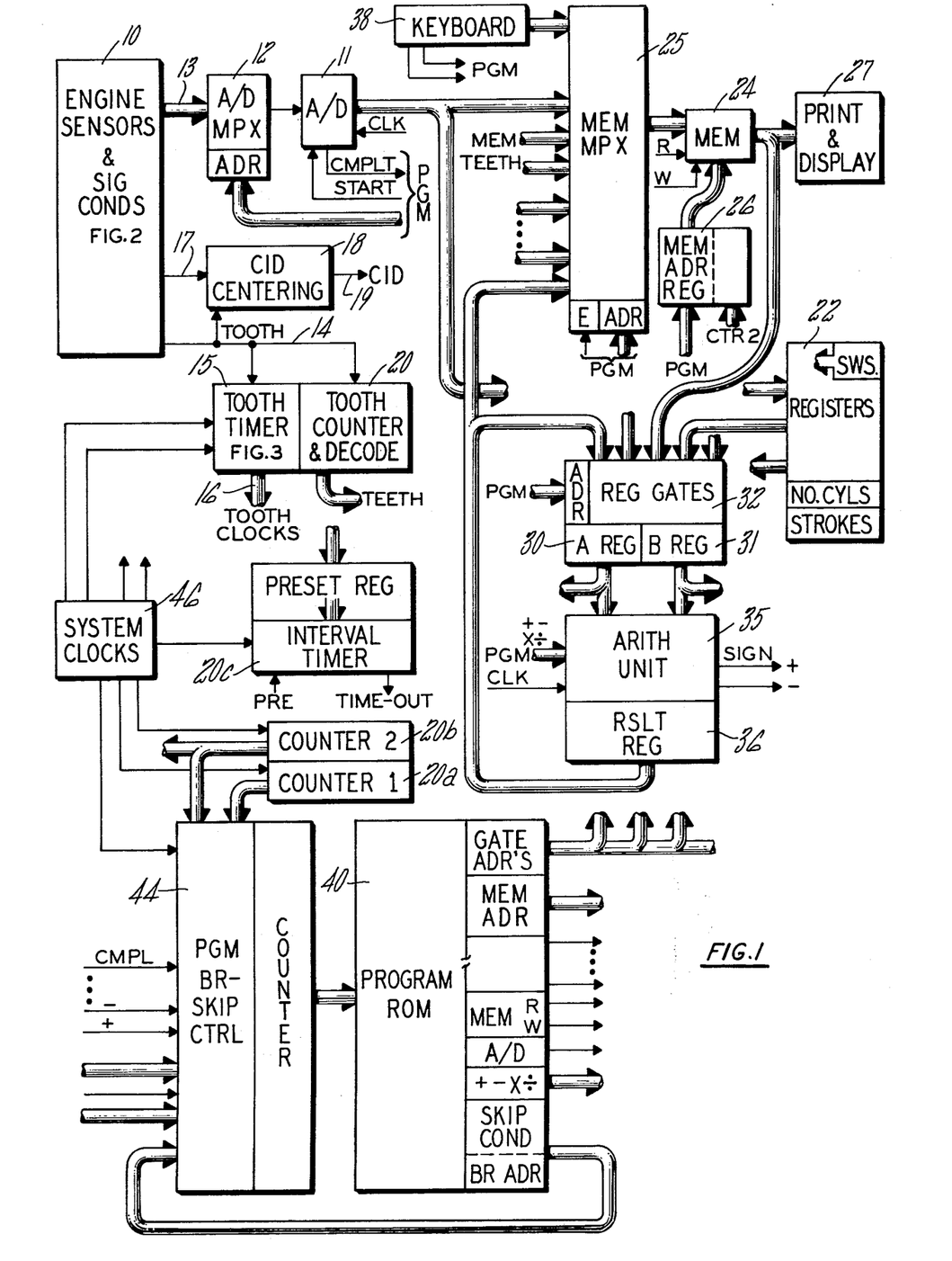
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the number of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and a display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
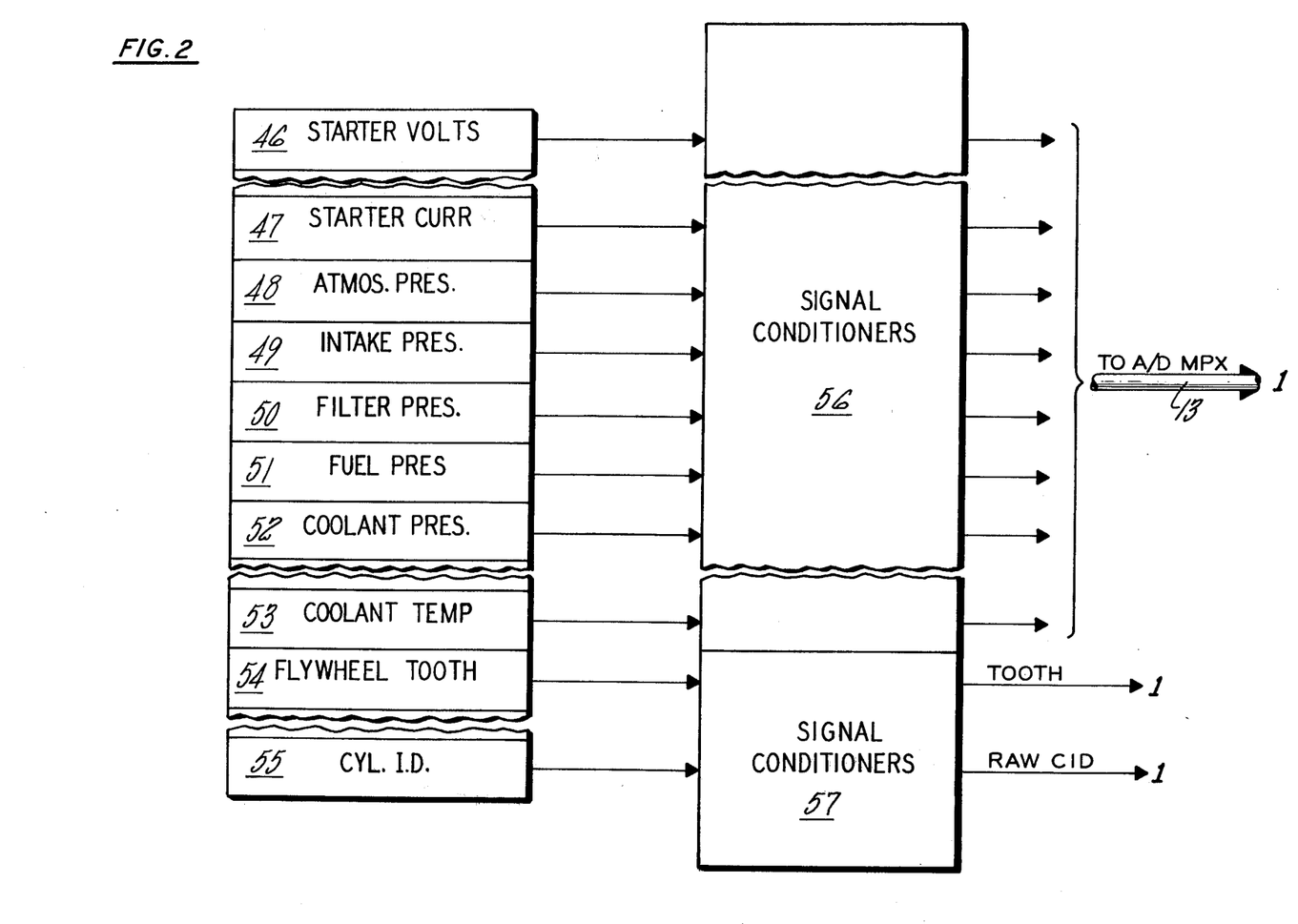
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitble ones of a wide variety known in the art, and form no part of the present invention.

Figure 3:
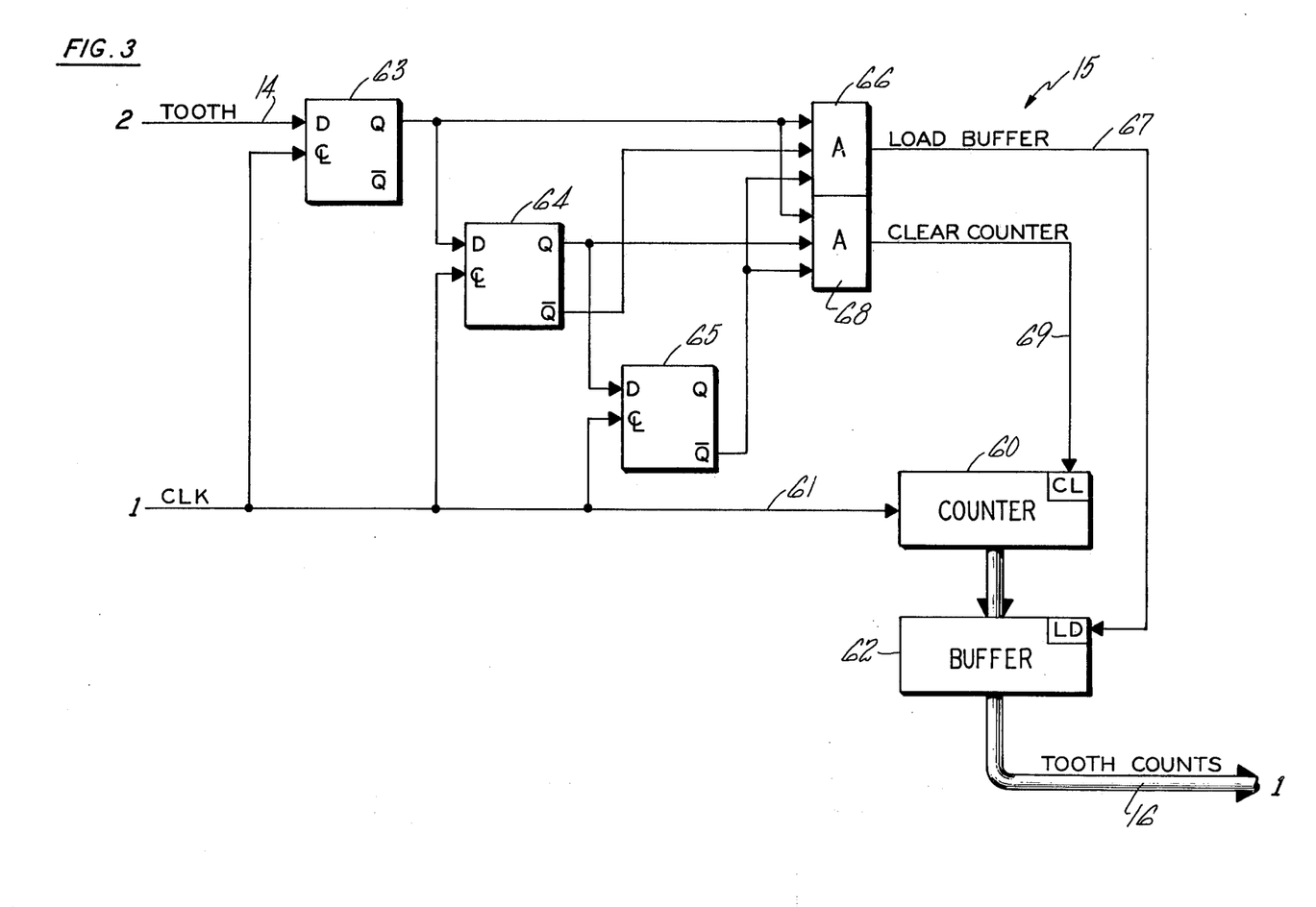
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al., Ser. No. 684,037), entitled "Determination of Number of Teeth on an Internal Combustion Engine Flywheel". Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 4:
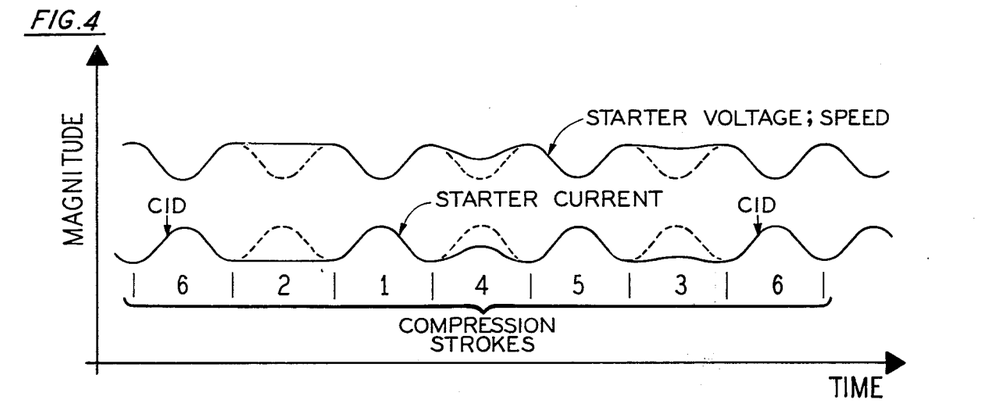
FIGS. 4–6 are diagramatic illustrations of principles of the invention.

Referring now to FIG. 4, a plot of starter voltage and/or speed (which are commensurate) is shown above an equivalent plot of starter current (which varies inversely with voltage and speed) of a reciprocating, internal combustion engine while cranking. In FIG. 4, it is assumed that cylinder two has no compression at all (such as all of the rings being missing), cylinder four has relatively poor compression, and cylinder three has compression which is so weak that the valley in the starter current waveform following the peak relating to cylinder three will not be detachable, as is described more fully hereinafter. In FIG. 4, the normal waveform for cylinders 2, 4, and 3 is represented by dotted lines. The present invention seeks to provide indications of the relative compression of the engine, that is the compression of each cylinder expressed in terms of other of the cylinders, such as a cylinder with maximum compression, by analysis of the excursions in the engine operating characteristic which reflects the loading affect of compression. When a cylinder has high compression and is very healthy, it takes more power to rotate the engine through the compression stroke of the cylinder than it does for a cylinder of very poor compression. When cranking, the power is supplied by a battery, and the more power required, the higher the current drain on the battery to the starter motor. The greater the current drain on the battery, the lower the voltage. Thus the starter current and the starter voltage are inversely related to each other, but accurately reflect the amount of battery loading required to compress the air in the cylinder on a cylinder-by-cylinder basis. Similarly, between compression strokes, starter current is small and battery voltage is high, and speed is high; the engine slows down, however, during the compression strokes for each of the cylinders. Thus speed is the parameter related to the actual power provided by current to the starter motor, which in turn is a function of the battery voltage. Thus speed and starter voltage vary in substantially the same way and oppositely to starter current. The following embodiment utilizes starter current as the indication of excursions in the engine operating condition for practicing the present invention, but either speed or starter voltage may be used as described hereinafter. In addition, the same tests can be performed, there being but a slight variation in the parameters (constants) used in the analysis, if the engine is idling. The reason for this is that the inertia is constant, the drag is constant at the average idle speed (the excursions do not affect the drag in any measurable amount, since they are relatively small compared to the difference between idle and high idle), so the variations in speed relate to the variations in work the engine must perform to compress air in successive cylinders.

Figure 5:
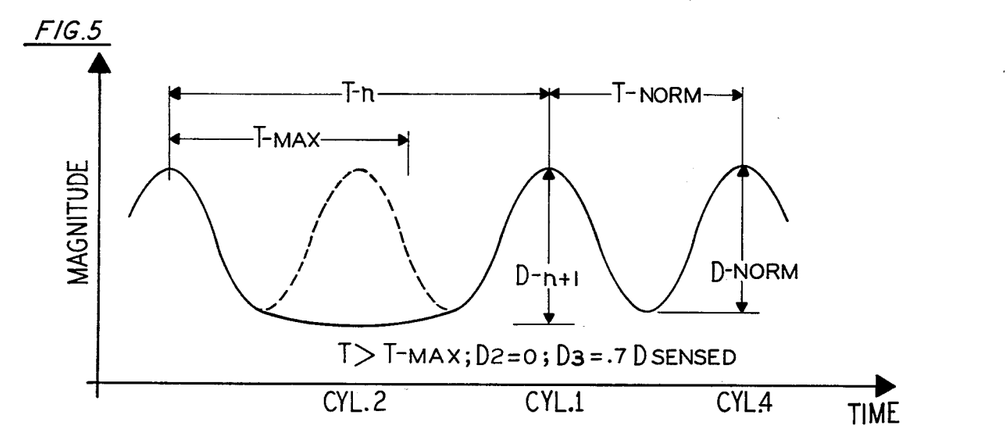

The present invention is illustrated more fully with respect to FIG. 5. Therein, the condition illustrated in FIG. 4 with respect to cylinder 2 is shown in more detail. When a cylinder has such low compression that no peak can be sensed for it, that fact is determined by the invention because the sensing of a peak when one is looked for will in fact be the peak for the following cylinder, and the time from sensing the preceding cylinder peak (T-$n$) will be greater than the amount of time allocated by the invention to sense a peak (T-max). In response to the peak being sensed after time out of a T-max interval, the value for the current cylinder (cylinder 2 in FIG. 4) is taken as zero, and the difference sensed between the dead cylinder (cylinder 2 in FIG. 4) and the peak sensed for the following cylinder (cylinder 1 in FIG. 4) is taken to be seven-tenths of the maximum, since the following cylinder will have a greater excursion as a consequence of the preceding cylinder being dead. Thus FIG. 5 illustrates the first test of the present invention which is whether or not a peak was sensed in a given time, and if not, to recognize a dead cylinder by giving it a minimal valley to peak difference (such as zero) and ascribing a fraction of the actual difference measured (from the valley of the dead cylinder to the peak of the second cylinder) to the second cylinder. This leaves the analysis at the peak of the second cylinder, so that it can proceed with normal processing looking for the valley of the next subsequent cylinder (cylinder 4 in FIG. 4).

Figure 6:
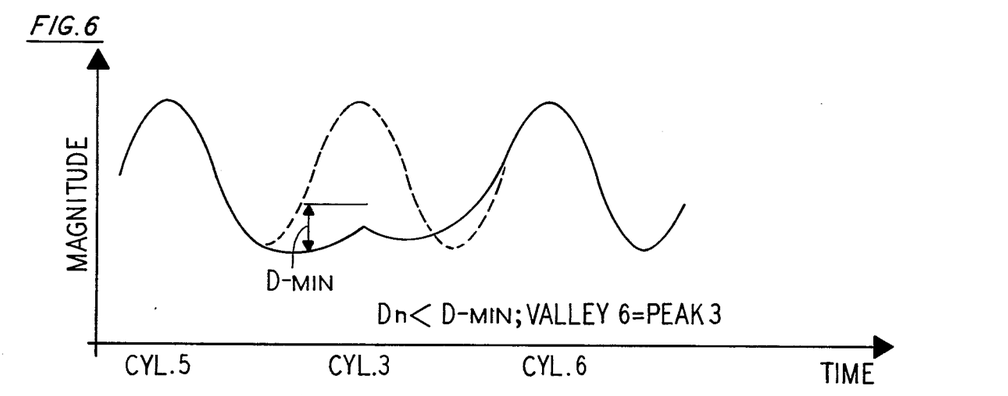

FIG. 6 illustrates the other important aspect of the present invention, which is avoiding a hangup in the sequence of analytical steps which senses a valley for one cylinder and a peak for that cylinder and takes the difference therebetween. The details of the conditions shown for cylinder 3 in FIG. 4 are shown in more detail in FIG. 6. Therein, it is seen that the peak for FIG. 6 is very small, and is determined to be less than a minimum difference (D) from its valley, which is referred to herein as D-min. In FIG. 6, the difference between the valley and the peak being smaller than the minimum allowed indicates the condition of perhaps being unable to sense a following valley. In this instance, the analysis switches from looking for the valley of cylinder 6 to looking for the peak of cylinder 6, and takes the peak for cylinder 3 as the valley for cylinder 6. This is valid because the difference between the peak of cylinder 3 and the following valley is very small when one assumes that one might not be able to detect it at all. Thus it is, that when the analysis determines a condition where it may not be able to sense a valley, because the preceding peak was so small, it takes the preceding peak in place and uses it as a data point for that valley, and switches the routine so as to look for a peak.

In the example herein, the maximum time (FIG. 5) is taken as some percentage of the normal time interval (T-norm) between peaks. This may be on the order of 130% of the normal time. And in FIG. 6, D-min is taken to be some fraction of the maximum difference or delta from valley to peak sensed for each of the cylinders. This fraction may be on the order of one-third or three-tenths of the maximum sensed.

To determine T-max and D-min, the processing may proceed in either of two ways. A first pass of sensing the conditions for each of the cylinders in turn may be made, the average time per cylinder may be measured, and T-max derived from it. Then while the engine continues to rotate, a second pass may be made where the conditions for each cylinder are sensed a second time (that is sensing a valley and a peak and taking the difference therebetween) for each cylinder, the maximum difference being multiplied by some factor (such as 0.3) to provide D-min. Then while the engine is still rotating the conditions for each cylinder can again be sensed, and the steps of the process of the invention be performed on-the-fly so as to recognize peaks as relating to a cylinder only if they occur within T-max, and to switch from seeking a valley to seeking a peak if the difference is less than D-min. On the other hand, the process may be practiced with two passes in which T-max and D-min are determined in the same pass; or the process may be practiced by sensing maxima and minima and storing a complete ensemble of data, following which the data is brought out in successive passes and processed as they would be on the fly, all is described more fully hereinafter.

In determining T-max and D-min it is possible that a missing cylinder (such as cylinder 2, FIG. 5) will cause the analysis procedure to actually utilize the time required for seven cylinders in order to determine T-max. However, this will simply give a comparison figure which is seven-sixths larger than the ideal T-max, which still is a very adequate measure of the fact that a cylinder is missing due to time out of the timer. Similarly, in a pass in which D-min is to be determined, there can be no factor for comparison therewith since no information is known about the magnitudes being sensed until D-min is in fact determined. But if in FIG. 6 the process proceeded to look for a valley without the comparison step, it in fact would find the valley after cylinder 6, thereby having dropped out one complete peak. But since only a maximum peak is utilized to find D-min, and since it really is not important as to whether cylinder 6 was in fact the maximum differential and should have been used to find D-min, some factor will be found and will be used which will provide analysis of the engine.

The illustration of FIG. 4 is unrealistic since any engine having that type of compression problems would not drive into a diagnostic system and be diagnosed. That is, if two cylinders are at least so weak that they would fail the D-min test shown in FIG. 6 (or if one of them were that weak and the other were so weak it would fail the test of FIG. 5) the engine would not be running. If the engine in fact did run, other indications (such as blow by) or the completely scrambled results of a compression test would be ample indication that a gross compression problem exists, whereby the sophistication of the present invention would not be needed in order to determine the relative compressional characteristics of the individual cylinders of the engine.

The processing involved in the present invention is described in an exemplary form, as it may be practiced in the exemplary diagnostic system described with respect to FIGS. 1-3 hereinbefore. In this example, starter current peaks and valleys and the differences therebetween are utilized to analyze the engine operating condition as an indication of the relative compression of each cylinder with respect to the others. This processing is set out as instructions which may be carried out by the data processing apparatus of FIG. 1, as a complete instruction set, although it should be understood that these may form simply a subset of a full instruction set utilized for diagnostics including the present invention and other diagnostic procedures.

Referring again to FIG. 4, it may be desirable to enhance system operation reliability by utilizing the CID signal as one of the indicators in the processing of information relating to cylinder position, to give greater assurance that the desired conditions (maxima and minima in the engine waveform) are sensed. Thus, although false signals could indicate peaks and valleys when there are none, starting the procedure with a CID signal can reduce the chance for error. However, it should be understood that this is not necessary and can be eliminated if desired.

Figure 7:
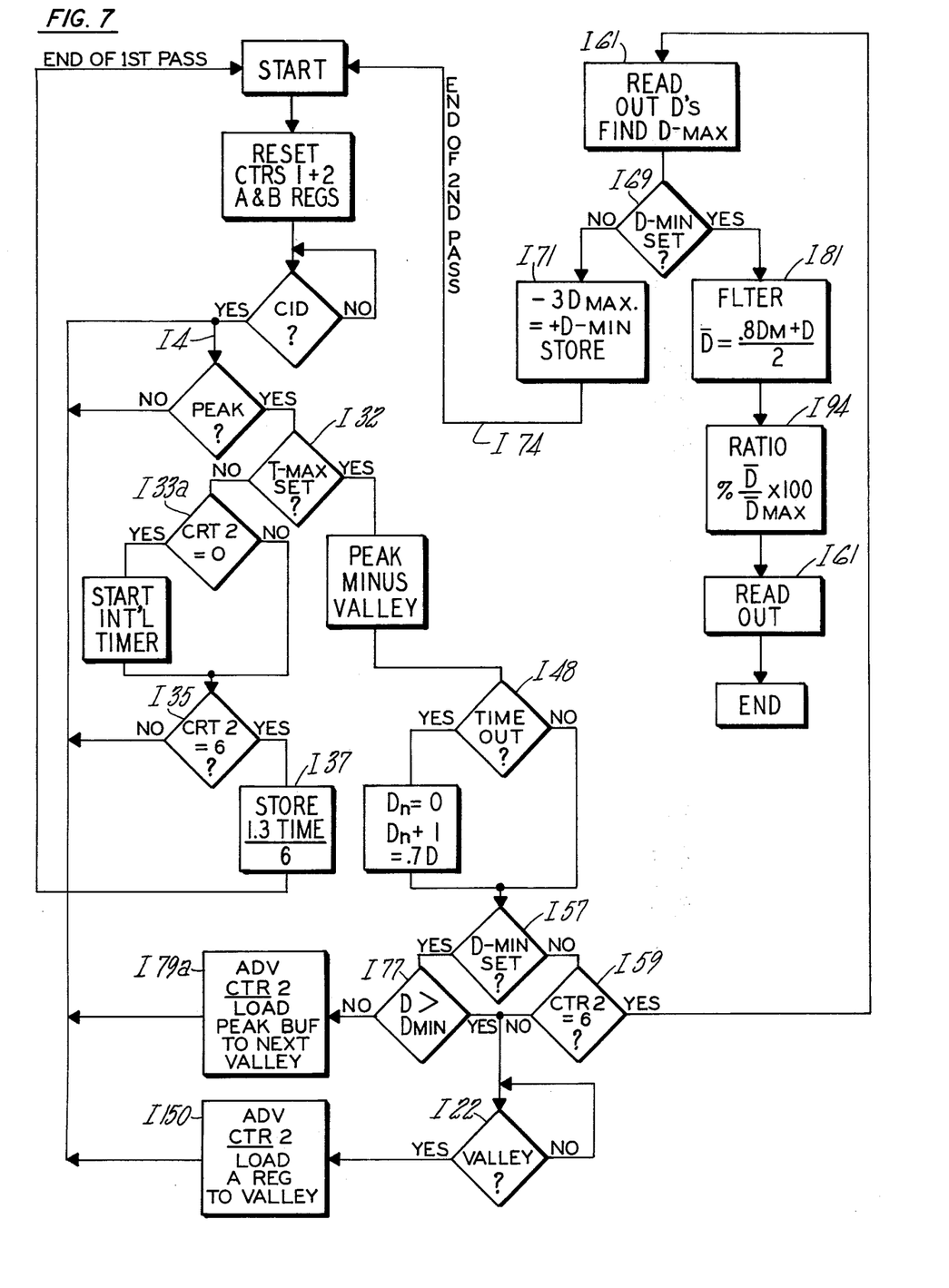
FIG. 7 is a simplified logic flow chart of illustrative processing in accordance with the invention

An example of programming of the data processing apparatus of FIG. 1 is shown in gross data flow fashion in FIG. 7, the reference numbers of which relate to instructions set out hereinafter. In this particular example, three passes of data are utilized to first determine the average time, then determine the minimum difference for comparison, and then to determine the actual values to be used in the relative compression determination. Each of the three passes is started off with a CID signal, as an example (although there is really no need to, and each pass could simply return to sensing a peak).

Starting of the routine, including sensing of the CID signal, may be as follows:

| Start | 1. | Reset counters 1 and 2; Reset A + B Regs |
|---|---|---|
| | 2. | Sense CID; skip one if yes |
| | 3. | Branch to 2 |

Once the CID has been sensed, then the task is to sense a peak which simply assures that regardless of the particular placement of the CID, knowledge of where the process is with respect to analyzing the conditions in the cranking characteristic of the engine will be assured. In this embodiment, to find a peak, the processing system will monitor the starter current until it has four samples, including a selected data point and three succeeding data points which are greater (not equal to and not less then) the selected data point, which shows that the waveform has a positive slope. Then the peak itself is detected by finding the next immediate negative slope as a selected data point for which the next three succeeding data points are definitely less than (not equal to and not greater) than the selected data point. This selected data point is taken as the peak. The program steps for finding the peak may be:

| Peak | 4. | Reset Counter 1 |
|---|---|---|
| + | 5. | A/D to Curr; Start A/D |
| Slope | 6. | Skip one if A/D COMPLT |
| | 7. | Branch to 6 |
| | 8. | Load A/D to A Reg |
| | 9. | A/D to Curr; Start A/D |
| | 10. | Skip one if A/D COMPLT |
| | 11. | Branch to 10 |
| | 12. | Load A/D to B Reg |
| | 13. | Subtract (A − B); Skip one on (−) |
| | 14. | Load B Reg to A Reg; Branch to 9 |

At this point, this system has learned that the first sample is not less than the second sample since subtracting the first from the second has resulted in a positive sign meaning that the answer is not negative, which would be the case if the second sample were in fact greater than the first sample. So the second sample is then taken as the selected data point by moving it from the B register into the A register. (It should be noted that in a system having less hardware and more complicated programming, the operands could have been loaded to addresses in memory set aside for that purpose, and the exchange could be made simply through memory addressing, in a very well known fashion. In this case, the second operand is available and, due to the failure to the test, it is simply moved to the A register to become the selected operand.) Then a new sample is brought in and compared with the selected sample by means of steps 9 through 13 and this is repeated until finally a beginning of a positive slope is detected by a negative result from the adder. Any time that the wrong relationship between the samples is indicated, the procedure starts over again so that four successive samples in a row have the right relationship. Thus even after two or three correct matches, if the fourth match is wrong, then at least four additional data points will be sensed looking for the positive slope. Whenever a single correct relationship is sensed, a second relationship is looked for (comparing the selected data point against the second subsequent sample to see if it has the proper relationship as well) and then the third, until counter one is equal to three, meaning three successful comparisons of the three subsequent samples have been made with the selected sample, according to the following steps:

15. Advance Counter 1
16. Skip one if Counter 1 = 3
17. Branch to 9

By sensing that counter 1 is equal to 3, the system has just determined that the selected data point has been followed by three data points of greater value indicating a positive slope. Now it is incumbent on the program to find a negative slope, the first data point of which will comprise a peak, according to the following program steps:

| | | |
|---|---|---|
| −Slope | 18. | Reset Counter 1 |
| | 19. | A/D to Curr; Start A/D |
| | 20. | Skip one if A/D CMPLT |
| | 21. | Branch to 20 |
| | 22. | Load A/D to B Reg |
| | 23. | A/D to Curr; Start A/D |
| | 24. | Skip one if A/D CMPLT |
| | 25. | Branch to 24 |
| | 26. | Load A/D to A Reg |
| | 27. | Subtract (A − B); Skip one on (−) |
| | 28. | Load B Reg to A Reg and to Memory (Peak Buffer); Branch to 23 |
| | 29. | Advance Counter 1 |
| | 30. | Skip one if Counter 1 = 3 |
| | 31. | Branch to 23 |

By sensing once again that counter 1 is equal to 3, the system has now determined that the selected data point has been followed by three data points of lesser value, indicating a negative slope, which, because it follows the positive slope determined in instructions 4–17, indicates a peak. In the present instance, the peak is simply used as a precursor along with the sensing of the CID signal to assure the system of the particular point in operation of the engine which it is monitoring, in order to give greater reliability of the peak and valley sensing which is done hereinafter.

Since the first step is to determine whether T-max has been determined, and since when T-max is stored it is stored as a negative number in the present counter, the high order bit of which can be sensed to determine whether or not it is set (negative), the first pass is identified by the fact that T-max has not been established by presetting the interval timer. Thus the entire first pass (FIG. 7) simply starts the interval timer and counts six peaks, through instructions 4–36. When the six peaks have been counted, then it stores a factor which is equal to 1.3 times the assumed average time of each of the cycles (for comparison, as described hereinbefore) in instructions 37–44, after which the program returns to start, and starts a second pass. An exemplary process for the first pass may be in accordance with the following instructions:

| | | |
|---|---|---|
| T-max | 32. | Skip one if T-max = − |
| | 33. | Branch to 45a |
| | 33a. | Skip 1 if counter 2 = 0 |
| | 33b. | Start interval timer |
| | 34. | Advance Counter 2 |
| | 35. | Skip 1 if Counter 2 = 0 |
| | 36. | Branch to 4 |
| | 37. | Load −1.3/6 Factor to B Reg |
| | 38. | Load Interval timer to A Reg |
| | 39. | Multiply |
| | 40. | Load RSLT to B Reg |
| | 41. | Reset A Reg |
| | 42. | Subtract |
| | 43. | Load RSLT to Interval timer Preset |
| | 44. | Branch to 1 |

Then the second pass will commence, and in this pass both peaks and valleys are sensed, and the differences (D) are saved, the maximum difference is found and the system will then start the third pass. In FIG. 7 instruction 32 will branch to instruction 45a since T-max has been set. Processing will follow the rule that if time-out did occur (I48, FIG. 7), before sensing a peak, then that peak is known to be the second peak in a row, as described hereinbefore; so the particular cylinder has a zero value and the next cylinder is given seven-tenths of the measured value through instruction 49 at et seq. Then if D-min has not been set (instruction 57) if all the cylinders have not been checked yet, the system simply locks for the next valley, remembering that valley-to-peak pairs are utilized in the processes in this example. But when the valley-to-peak differences for six cylinders have been sensed in the second pass, then instruction 59 will cause branching to instruction 61, where the maximum of the differences is found. Then if it is determined that D-min is not yet set, D-min must be calculated from this maximum, which is performed in instructions 71–73. Notice that in the normal peak and valley processing in the second and third passes, whenever a peak is sensed, the peak-to-valley difference is taken and the result is stored in the valley location (permanently allocated to the particular cylinder) since the valley information is of no interest. Also notice that advancing of counter two during the first pass is done whenever a peak is sensed since only peaks are sensed, but is done in the second and third passes after sensing a valley but before loading the valley to memory (or just before loading the previous peak into a valley when it is taken to be the valley). An exemplary process for finding vallyes is shown in instructions 122-152, and instructions for finding D-min after sensing a valley and a peak are instructions 45a–73, instruction 74 branching to instruction 1 to start the third pass. These exemplary instructions are:

| | | |
|---|---|---|
| Find D | 45a. | Start Interval timer |
| | 45b. | Load MEM (Ctr 2) to B Reg |
| | 46. | Subtract |
| | 47. | Load RSLT to MEM (Ctr 2) |
| | 48. | Skip one if time-out |
| | 49. | Branch to 57 |
| Time-Out | 50. | Load ZERO to MEM (Ctr 2) |
| | 51. | Advance Counter 2 |
| | 52. | Load RSLT to A Reg |

-continued

| | 53. | Load .7 factor to B Reg |
|---|---|---|
| | 54. | Multiply |
| | 55. | Load RSLT to MEM (Ctr 2) |
| | 56. | Skip two if time-out |
| | 57. | Skip one if D-min = + |
| | 58. | Branch to 75 |
| | 59. | Skip one if Counter 2 = 6 |
| | 60. | Branch to 122 |
| Max | 61. | Reset A and B Regs and Counter 2 |
| | 62. | Skip 1 if Counter 2 = 6 |
| | 63. | Branch to 69 |
| | 64. | Load MEM (Ctr 2) to B Reg |
| | 65. | Subtract; skip one on + |
| | 66. | Load B Reg to A Reg |
| | 67. | Advance Counter 2 |
| | 68. | Branch to 62 |
| Find | 69. | Skip one if D-min = − |
| D-min | | |
| | 70. | Branch to 81 |
| | 71. | Load −.3 factor to B Reg |
| | 72. | Multiply |
| | 73. | Load RSLT to (D-min) Buffer |
| | 74. | Branch 1 |

In the third pass, T-max is set and D-min is set so instruction 75 is reached from instruction 58 and instructions 75–77 determine if the present difference (valley to peak) is greater than D-min, anf if it is, it having already been stored away in instruction 47, the program simply branches to finding the next valley, but instructions 79–80 advance the counter and store the present peak as the next valley and causes the system to look for a peak instead of a valley.

Exemplary instructions are:

| D< | 75. | Load D-min buffer to B Reg |
|---|---|---|
| D-min | 76. | Add (-D-min; = subtr) |
| | 77. | Skip one if − |
| | 78. | Branch to 122 |
| | 79. | Advance Counter 2 |
| | 79a. | Load Peak Buffer to MEM (Ctr 2) |
| | 80. | Branch to 4 |

When all six valley-to-peak differences have been measured in the third pass, instruction 59 causes the maximum to be determined by instruction 61 et seq and instruction 69 causes instructions 81 et seq to take the equivalent of eight-tenths of the maximum plus each individual value divided by two, and then ratio all of them to the maximum, averaged one so determined. Since the factor to be divided by two will cancel out in a relative expression anyway, it is eliminated, to save dividing all of them; and, to save multiplying each of the ratios by 100 so as to come out with percentages, the maximum one is divided by 100 so the ratios will be exactly in percent. Exemplary instructions are:

| Filter | 81. | Load .7 factor to B Reg |
|---|---|---|
| | 82. | Multiply |
| | 83. | Load RSLT to B Reg |
| | 84. | Add |
| | 85. | Load RSLT to MEM (.7 D-max) |
| | 86. | Reset Counter 2 |
| | 87. | Skip one if Counter 2 ≠ 6 |
| | 88. | Branch to 94 |
| | 89. | Load MEM (Ctr 2) to A Reg |
| | 90. | Add |
| | 91. | Load RSLT to MEM (Ctr 2) |
| | 92. | Advance Counter 2 |
| | 93. | Branch to 87 |
| % | 94. | Load 100 factor to B Reg |
| | 95. | Load MEM (.8D-max) to A Reg |
| | 96. | Divide |
| | 97. | Load RSLT to B Reg |
| | 98. | Reset Counter 2 |
| | 99. | Slip one if Counter 2 ≠ 6 |
| | 100. | Branch to 106 |
| | 101. | Load MEM (Ctr 2) to A Reg |
| | 102. | Divide |

-continued

| | 103. | Load RSLT to MEM (Ctr 2) |
|---|---|---|
| | 104. | Advance Counter 2 |
| | 105. | Branch to 99 |

Then the system may read out the percentage of relative compression results to the print and display apparatus 27 (FIG. 1). If the operator had entered a cylinder number indicating which cylinder he had placed the CID sensor to sense, then that number could be available to cause read out of the relative compression results on a firing order basis; if an indication of the CID location has not been made, or if CID is not used, the results can be read out in a random order. This forms no part of the present invention. In instructions 106–121a, read out is made in order starting with the cylinder which the operator has indicated to be the location of the CID sensor:

| Read- | 106. | Load CID cyl Factor to A Reg |
|---|---|---|
| out | 107. | Reset Counter 2 |
| | 108. | Advance Counter 2 |
| | 109. | Load Counter 2 to B Reg |
| | 110. | Subtract |
| | 111. | Skip one if − |
| | 112. | Branch to 108 |
| | 113. | Load MEM (Ctr 2) to Print & Display |
| | 114. | Skip one if Counter 2 = 6 |
| | 115. | Branch to 108 |
| | 116. | Reset Counter 2 |
| | 117. | Advance Counter 2 |
| | 118. | Load Counter 2 to B Reg |
| | 119. | Subtract |
| | 120. | Skip one if + |
| | 121. | Branch to 117 |
| | 121a. | END ROUTINE |

Detecting of valleys is fully analogous to the detecting of peaks except that a negative slope is first detected followed by a positive slope, as follows:

| Valley | 122. | A/D to Curr; Start A/D |
|---|---|---|
| + | 123. | Skip one if A/D CMPLT |
| Slope | 124. | Branch to 123 |
| | 125. | Load A/D to B Reg |
| | 126. | Reset Counter 1 |
| | 127. | A/D to Cur; Start A/D |
| | 128. | Skip one if A/D CMPLT |
| | 129. | Branch to 128 |
| | 130. | Load A/D to A Reg |
| | 131. | Subtract (A − B); Skip one on (−) |
| | 132. | Load B Reg to A Reg; Branch to 126 |
| | 133. | Advance Counter 1 |
| | 134. | Skip one if Counter 1 = 3 |
| | 135. | Branch to 127 |
| | 136. | A/D to Curr; Start A/D |
| | 137. | Skip one if A/D CMPLT |
| | 138. | Branch to 137 |
| | 139. | Load A/D to A Reg |
| | 140. | Reset Counter 1 |
| − | 141. | A/D to Curr; Start A/D |
| slope | 142. | Skip one if A/D CMPLT |
| | 143. | Branch to 142 |
| | 144. | Load A/D to B Reg |
| | 145. | Subtract (A − B); Skip one on (−) |
| | 146. | Load B Reg to A Reg and to MEM (Ctr 2); Branch to 140 |
| | 147. | Advance Counter 1 |
| | 148. | Skip one if Counter 1 = 3 |
| | 149. | Branch to 141 |
| | 150. | Advance Counter 2 |
| | 151. | Load A Reg to MEM (Ctr 2) |
| | 152. | Branch to 4 |

As alluded to briefly hereinbefore, the particular nature of the data processing apparatus, and therefore the commensurate required program form no part of the present invention. In fact, the peak and valley detecting can be achieved in an obvious fashion utilizing analog peak and valley detectors applied to the electrical current waveform, or a single analog peak detector may be applied to the current for storing one set of parameters and to the starter voltage for storing another set of parameters.

The foregoing exemplary program steps illustrate the utilization of starter current to determine the excursions in the engine operating condition in order to tell when to take the electrical measurements. In an extremely obvious fashion, the starter voltage could be used instead; all that need be done is to address the A/D multiplexer to the starter voltage rather than to the starter current during peak and valley detecting, and the system will operate quite well. If desired, to save time, a first voltage valley can be sensed as a precursor to sensing a voltage peak and a voltage valley for taking measurements in the fully analogous fashion to the present invention; however, as long as the two extremes (maxima and minima) are sensed, the order does not matter, nor is sensing the precursor peak or valley mandatory.

Although the invention has been shown as responding to an electrical parameter of the starter, which provides an indication of the excursions of engine operating conditions, the engine excursions may instead be sensed directly by speed. An exemplary substitute program portion for sensing a valley in speed (equivalent to a peak in starter current) is as follows:

1. Reset Counters 1 and 2
2. Sense CID; Skip one if yes
3. Branch to 2
4. Reset counter 1
5. Load Tooth timer to A Reg
6. Start Interval timer
7. Skip one if time = 20 ms
8. Branch to 7
9. Load Tooth timer to B Reg
10. Subtract (A − B); Skip one on −
11. Load B Reg to A Reg; Branch to 6
12. Advance counter 1
13. Skip one if counter 1 = 3
14. Branch to 6

A time delay is used in instructions 7 and 8 simply because adjacent tooth times are so close to each other as to be not necessarily indicative of a tendency of an increase in the slope, due to engine perturbations and general noise. However, that time interval is adjustable and may, in a system in which the tooth sensing and signal conditioning is carefully implemented, be reduced substantially or eliminated. Similarly, the branching based on the count in counter 1 can be conditioned on a higher number of counts so that a longer interval is utilized before saying that the trend is accepted as a positive slope. The detecting of a negative slope to determine the actual peak, and the detecting of negative and positive slopes to determine the position of a valley, is fully commensurate with the example given hereinbefore for current sensing, modified as indicated by the positive slope detecting set out above in response to the tooth timer.

In the foregoing example, once a peak is found, the data processing apparatus immediately finds a second negative slope, after the one which identifies the peak, indicating that a valley is being approached; this is done wholly independently in the present embodiment, though in some instances it need not necessarily be. Once the negative slope is sensed looking for a valley, the program immediately switches to looking for a positive slope; but since the negative slope is sensed immediately following a peak, the program will continuously be rejecting data points, and selecting new data points, until the actual peak is reached. However, this poses no problem and does provide for sensing the first data point which represents a valley, as indicated by the positive slope resulting from three following data points being of greater magnitude.

The foregoing description has assumed that a six cylinder engine is used, and counter 2 has therefore normally been counting for six cylinders. However, if a different number of cylinders exists in the engine under test, then a number other than six must be used. Depending on the electronic processing equipment used, this may be accommodated in a variety of fashins, as is known in the art. Similarly, the storage and retrieval of factors (such as 0.7, 0.8) and the like has been assumed to be from whatever location in memory it may have been placed, or from whichever hardware register may contain them. All of this is totally immaterial to the present invention.

From the foregoing processing, it can be understood that the present invention has several important attributes. The first of these is using any common parameter (current, voltage or speed) which is indicative of engine speed and therefore of the speed excursions resulting from cylinder compression strokes, to determine relative compression. More importantly though, the invention does this without any assistance from ignition parameters. And, the invention determines by measuring the time between measurement of successive indications of speed maxima and minima, in pairs, when a weak cylinder is determined to be missing from the pattern, and provides for proper sensing even though one of the speed indications may be masked due to weakness of a cylinder.

Thus, although the invention has been shown and described with respect to preferred embodiments thereof, it should be understood by those skilled in the art that the foregoing and various other changes, omissions and additions may be made therein and thereto without departing from the spirit and the scope of the invention.

Having thus described typical embodiments of my invention, that which I claim as new and desire to secure by Letters Patent is:

1. In a method for providing an indication of relative cylinder compression of a reciprocating internal combustion engine, the steps of:
   determining in turn the maxima and minima in the speed of a rotating engine from excursions in magnitude of a signal derived from an engine parameter, the magnitude of which follows excursions in engine speed as a consequence of successive cylinder-related compression strokes, and providing successive manifestations thereof referred to hereinafter as "max" and "min", respectively;
   providing the difference between the magnitudes of each max and the next succeeding min after sensing each min and before sensing the next max; and
   comparing each provided difference with a predetermined difference to thereby determine when the speed excursions are sufficiently small that detection of the next succeeding max may be impaired, and in response thereto, utilizing the last min sensed as the next succeeding max and next sensing thereafter the next succeeding min.

2. In a method for providing an indication of relative cylinder compression of a reciprocating internal combustion engine, the steps of:
   determining in turn the maxima and minima in the speed of a rotating engine from excursions in magnitude of a signal derived from an engine parameter, the magnitude of which follows excursions in engine speed as a consequence of successive cylinder-related compression strokes, and providing successive manifestations thereof in pairs;

providing a manifestation of the difference between the magnitudes of each pair sensed;

comparing the time interval between sensing of adjacent pairs with a predetermined time interval to determine if the second one of said manifestations in a pair relates to the same cylinder as the preceeding one of said manifestations in said pair; and providing for each cylinder a result manifestation indicative of the measured relative compression for that cylinder in response to the difference manifestation provided for each pair related to a corresponding cylinder, and when said time interval exceeds said predetermined time interval, providing for the cylinder related to the first manifestation of the pair sensed during the excessive interval, a predetermined result manifestation related to minimal compression, and providing for the cylinder related to the second manifestation of the pair sensed during the excessive interval a result manifestation related to the difference manifestation provided for the pair in said excessive interval.

3. A method according to claim 2 wherein the result manifestation provided to the cylinder related to the second one of said manifestation of the pair sensed during the excessive interval is a fraction of the difference manifestation for the pair in said excessive interval.

4. In a method of providing an indication of relative cylinder compression of a reciprocating internal combustion engine, the steps of:

sensing, in an expected order, extremes in magnitude representing successive, alternate maxima and minima in a signal derived from an engine parameter having excursions in magnitude which indicate the excursions in speed of a rotating engine on a cylinder-by-cylinder basis due to the compression stroke of each cylinder in turn, said expected order comprising sensing a magnitude indicating maximum speed followed by sensing a magnitude indicating minimum speed, as a pair, respectively;

providing a manifestation of the difference between the magnitudes of each pair sensed;

comparing the time interval between adjacent minimum speed magnitudes against a predetermined time interval to determine if the second one of said minimum speed signals relates to the same cylinder as the preceeding one of said maximum speed signals;

comparing the difference manifestation for each of said pairs relating to a predetermined difference manifestation to thereby determine when the excursions are too small to permit detection of the maximum speed magnitude next following said pair, and utilizing the minimum speed magnitude of said pair as the maximum speed magnitude of the next pair in said order in response thereto; and providing for each cylinder a data manifestation indicative of the measured relative compression for that cylinder in response to the difference manifestation for each pair related to a corresponding cylinder, or when said time interval exceeds said predetermined time interval, providing for the cylinder related to the maximum speed magnitude of the pair sensed during the excessive interval a predetermined data manifestation related to minimal compression, and providing for the cylinder related to the minimum speed magnitude of the pair sensed during the excessive interval a data manifestation related to the difference manifestation for the pair in said excessive interval.

5. A method according to claim 4 wherein the data manifestation provided to the cylinder related to the minimum speed magnitude of the pair sensed during the excessive interval is a fraction of the difference manifestation for the pair in said excessive interval.

6. Apparatus for providing an indication of relative compression of a reciprocating internal combustion engine, comprising:

sensing means adapted to be disposed for a response to the magnitude of an engine parameter, the magnitude of which fluctuates in conjunction with the cylinder-related, sub-cyclic excursions in engine speed as a consequence of the compression strokes of the individual cylinders, said sensing means providing a corresponding compression signal; and processing apparatus, responsive to said sensing means, comprising means for determining successive magnitudes in the excursions of said compression signal respectively relating to maximum engine speed and to minimum engine speed, providing max signals and min signals corresponding thereto, providing a difference manifestation related to the difference in magnitude between each min signal and the next succeeding one of said max signals and comparing it against a predetermined difference, and when the difference is less than said predetermined difference, utilizing the related min signal as the next max signal and thereafter next sensing the next succeeding magnitude related to minimum engine speed.

7. Apparatus according to claim 6 wherein said processing apparatus also comprises means for:

comparing the time interval between sensing of adjacent pairs of max and min signals with a predetermined time interval to determine if the min signal of the pair relates to the same cylinder as the max signal of said pair, and providing for each cylinder a result manifestation indicative of the measured relative compression for that cylinder in response to the difference manifestation for each pair related to a corresponding cylinder, and when said time interval exceeds said predetermined time interval, providing for the cylinder related to the max signal of the pair sensed during the excessive interval, a predetermined result manifestation related to minimal compression, and providing for the cylinder related to the min signal of the pair sensed during the excessive interval a result manifestation related to the difference manifestation provided for the pair in said excessive interval.

8. A method according to claim 7 wherein the result manifestation provided to the cylinder related to the min signal of the pair sensed during the excessive interval is a fraction of the difference manifestation provided for the pair in said excessive interval.

9. Apparatus according to claim 6 wherein said processing apparatus also comprises means for:

averaging the difference determined for each of said cylinders with a fraction of the maximum difference determined for any of said cylinders to provide a manifestation of a filtered difference for each of said cylinders.

10. Apparatus according to claim 9 wherein said processing apparatus also comprises means for:
expressing the average difference represented by the filtered difference manifestation for each of said cylinders as a percentage of the averaged difference expressed by the filtered difference manifestation for the one of said cylinders having the maximum difference.

* * * * *

UNITED STATES PATENT AND TRADEMARK OFFICE
CERTIFICATE OF CORRECTION

PATENT NO. : 4,050,296
DATED : September 27, 1977
INVENTOR(S) : Richard S. Benedict It is certified that error appears in the above-identified patent and that said Letters Patent are hereby corrected as shown below:

Column 1, line 14  "684,226" should read --684,220--

Column 1, line 17  "(CLD)" should read --(CID)--

Column 1, line 38  "the" should read --this--

Column 2, line 68  After "invention" insert --.--

Column 3, line 64  "number" should read --manner--

Column 6, line 7  "suitble" should read --suitable--

Column 7, line 27  "detachable" should read --detectable--

Column 8, line 65  After "ways" insert --.--

Column 10, line 51  "COMPLT" should read --CMPLT--

Column 10, line 54  "COMPLT" should read --CMPLT--

Column 11, line 5  "to" first occurrence should read --of--

Column 11, line 57  "of" should read --to--

Column 11, line 61  "present" should read --preset--

Column 12, line 55  "vallyes" should read --valleys--

Column 13, line 18  "Branch 1" should read --Branch to 1--

Column 13, line 23  "anf" should read --and--

UNITED STATES PATENT AND TRADEMARK OFFICE
CERTIFICATE OF CORRECTION

PATENT NO. : 4,050,296
DATED : September 27, 1977
INVENTOR(S) : Richard S. Benedict It is certified that error appears in the above-identified patent and that said Letters Patent are hereby corrected as shown below:

Column 13, line 66 "Slip" should read --skip--

Column 16, line 10 "fashins" should read --fashions--

Signed and Sealed this

First Day of August 1978

[SEAL]

Attest:

RUTH C. MASON
*Attesting Officer*

DONALD W. BANNER
*Commissioner of Patents and Trademarks*